US010635208B2

(12) United States Patent
Lee et al.

(10) Patent No.: US 10,635,208 B2
(45) Date of Patent: Apr. 28, 2020

(54) DISPLAY PANEL HAVING BUILT-IN TOUCHSCREEN AND TOUCH DISPLAY DEVICE INCLUDING THE SAME

(71) Applicant: LG DISPLAY CO., LTD., Seoul (KR)

(72) Inventors: TaeKeun Lee, Chilgok-gun (KR); SooYoung Choi, Gumi-si (KR); In Kang, Jung-gu (KR)

(73) Assignee: LG Display Co., Ltd., Seoul (KR)

( * ) Notice: Subject to any disclaimer, the term of this patent is extended or adjusted under 35 U.S.C. 154(b) by 233 days.

(21) Appl. No.: 15/296,947

(22) Filed: Oct. 18, 2016

(65) Prior Publication Data

US 2017/0115809 A1    Apr. 27, 2017

(30) Foreign Application Priority Data

Oct. 27, 2015    (KR) .................. 10-2015-0149791

(51) Int. Cl.
*G06F 3/041* (2006.01)
*G09G 3/20* (2006.01)
*G06F 3/044* (2006.01)
*G02F 1/1333* (2006.01)

(52) U.S. Cl.
CPC .......... *G06F 3/0412* (2013.01); *G06F 3/044* (2013.01); *G06F 3/0416* (2013.01); *G09G 3/20* (2013.01); *G02F 1/13338* (2013.01); *G09G 2300/0426* (2013.01); *G09G 2354/00* (2013.01)

(58) Field of Classification Search
None
See application file for complete search history.

(56) References Cited

U.S. PATENT DOCUMENTS

| 9,465,490 B2* | 10/2016 | Hinson | G06F 3/044 |
| 2013/0127739 A1* | 5/2013 | Guard | G06F 3/044 345/173 |
| 2013/0335365 A1* | 12/2013 | Kim | G06F 3/044 345/174 |
| 2014/0118642 A1* | 5/2014 | Wang | G02F 1/13338 349/12 |
| 2014/0320767 A1 | 10/2014 | Xu et al. | |

(Continued)

FOREIGN PATENT DOCUMENTS

| CN | 104199586 A | 12/2014 |
| CN | 104298386 A | 1/2015 |

(Continued)

OTHER PUBLICATIONS

Lee et al., Machine Translation of Foreign Patent Application KR 10-2015-0004341 Equivalent of US 2016/0202814 A1, Display Device Including Touch Sensor, Aug. 21, 2016, pp. 1-9.*

*Primary Examiner* — Amr A Awad
*Assistant Examiner* — Maheen I Javed
(74) *Attorney, Agent, or Firm* — Seed Intellectual Property Law Group LLP

(57) ABSTRACT

A display panel is provided having a built-in touchscreen and a touch display device including the same. The display panel has a touch electrode structure allowing parasitic capacitance to be dispersed to a greater number of gate lines, which form parasitic capacitance together with touch electrodes, without concentrically relying on specific gate lines. Differences in load between gate lines are reduced to improve image quality.

20 Claims, 13 Drawing Sheets

(56) References Cited

U.S. PATENT DOCUMENTS

2015/0062067 A1\* 3/2015 Hong ...................... G06F 3/046
                                                      345/174
2016/0202814 A1\* 7/2016 Lee ......................... G06F 3/044
                                                      345/173
2016/0252996 A1\* 9/2016 Jiang ................. G02F 1/134336
                                                      345/174

FOREIGN PATENT DOCUMENTS

| TW | 201409296 A | 3/2014 |
| TW | M486093 U   | 9/2014 |
| TW | 201504892 A | 2/2015 |

\* cited by examiner

DISPLAY PANEL HAVING BUILT-IN TOUCHSCREEN AND TOUCH DISPLAY DEVICE INCLUDING THE SAME

CROSS REFERENCE TO RELATED APPLICATION

This application claims priority from Korean Patent Application Number 10-2015-0149791, filed Oct. 27, 2015, which is hereby incorporated by reference for all purposes as if fully set forth herein.

BACKGROUND

Technical Field

Exemplary embodiments of the present disclosure relate to a display panel having a built-in touchscreen and a touch display device including the same.

Description of the Related Art

In response to the development of the information society, demand for a variety of display devices for displaying images is increasing. In this regard, a range of display devices, such as liquid crystal display (LCD) devices, plasma display panels (PDPs), and organic light-emitting display devices, have recently been used.

Many display devices provide touch-based input interfaces enabling users to intuitively and conveniently input data or instructions directly to devices, rather than using conventional input systems, such as buttons, a keyboard, or a mouse.

To provide such touch-based input interfaces, the ability to sense a user touch and accurately detect touched coordinates is required.

In this regard, capacitive touch sensing is commonly used, in which a plurality of touch electrodes (e.g., row electrodes and column electrodes) are disposed on a touchscreen panel (TSP) to detect a touch and touched coordinates based on changes in capacitance between specific touch electrodes or changes in capacitance between specific touch electrodes and a pointer, such as a finger.

However, during touch driving and touch sensing, undesirable parasitic capacitance may be formed in addition to capacitance required for touch sensing.

Undesirable parasitic capacitance may be formed between touch electrodes and gate lines. In this case, parasitic capacitance may be concentrically formed on specific gate lines depending on the touch electrode structure. This may consequently cause differences in parasitic capacitance between gate lines, thereby causing differences in load between gate lines.

Such differences in load between gate lines may cause differences in characteristic between gate signals supplied through gate lines, thereby lowering image quality.

This problem may become more significant for a display device having a touchscreen panel disposed within a display panel thereof.

BRIEF SUMMARY

Various aspects of the present disclosure provide a display panel having a built-in touchscreen and a touch display device including the same, wherein the display panel has a touch electrode structure allowing parasitic capacitance to be dispersed to a greater number of gate lines, which form parasitic capacitance together with touch electrodes, without concentrically relying on specific gate lines.

Also provided are a display panel having a built-in touchscreen and a touch display device including the same, the display panel being able to reduce differences in load between gate lines.

According to an aspect of the present disclosure, a display panel having a built-in touchscreen may include: a plurality of data lines arranged in a first direction; a plurality of gate lines arranged in a second direction; and a plurality of touch electrodes arranged in N number of rows, where $N \geq 2$, and M number of columns, where $M \geq 2$.

In the display panel having a built-in touchscreen, an nth touch electrode row in the N number of touch electrode rows may include a first touch electrode and a second touch electrode adjacent to each other in a row direction, where $1 \leq n \leq N-1$. In addition, an (n+1)th touch electrode row in the N number of touch electrode rows may include a third touch electrode and a fourth touch electrode adjacent to each other in the row direction, where $2 \leq n+1 \leq N$.

The first touch electrode and the third touch electrode may be adjacent to each other in a column direction, while the second touch electrode and the fourth touch electrode may be adjacent to each other in the column direction.

In the display panel having a built-in touchscreen, a boundary area between the first touch electrode and the third touch electrode and a boundary area between the second touch electrode and the fourth touch electrode may be disposed on different lines.

In the display panel having a built-in touchscreen, the touch electrode rows may be arranged in a diagonal manner.

According to another aspect of the present disclosure, a touch display device may include: a display panel including a plurality of data lines and a plurality of gate lines arranged thereon and a plurality of touch electrodes arranged in N number of rows, where $N \geq 2$, and M number of columns, where $M \geq 2$; and a touch circuit sensing a touch by driving the plurality of touch electrodes.

In the touch display device, an nth touch electrode row in the N number of touch electrode rows may include a first touch electrode and a second touch electrode adjacent to each other in a row direction, where $1 \leq n \leq N-1$, while an (n+1)th touch electrode row in in the N number of touch electrode rows may include a third touch electrode and a fourth touch electrode adjacent to each other in the row direction, where $2 \leq n+1 \leq N$. The first touch electrode and the third touch electrode may be adjacent to each other in a column direction, while the second touch electrode and the fourth touch electrode may be adjacent to each other in the column direction. A boundary area between the first touch electrode and the third touch electrode and a boundary area between the second touch electrode and the fourth touch electrode may be disposed on different lines.

According to another aspect of the present disclosure, a display panel having a built-in touchscreen may include: a plurality of data lines arranged in a first direction; a plurality of gate lines arranged in a second direction; and a plurality of touch electrodes arranged in N number of rows, where $N \geq 2$, and M number of columns, where $M \geq 2$.

In the display panel having a built-in touchscreen, an edge portion of each of the touch electrodes formed in the column direction has the shape of a stair including two or more steps.

In the display panel having a built-in touchscreen, the two or more steps of the edge portion of each of the touch electrodes formed in the column direction may be positioned to correspond to two or more gate lines among the plurality of gate lines.

According to still another aspect of the present disclosure, a touch display device may include: a display panel including a plurality of data lines and a plurality of gate lines arranged thereon and a plurality of touch electrodes arranged in N number of rows, where N≥2, and M number of columns, where M≥2; and a touch circuit sensing a touch by driving the plurality of touch electrodes.

In the touch display device, an edge portion of each of the plurality of touch electrodes formed in a column direction may have the shape of a stair including two or more steps.

According to the present disclosure, it is possible to provide a display panel having a built-in touchscreen and a touch display device including the same, the display panel having a touch electrode structure allowing parasitic capacitance to be dispersed to a greater number of gate lines, which form parasitic capacitance together with touch electrodes, without concentrically relying on specific gate lines.

In addition, according to the present disclosure it is possible to provide a display panel having a built-in touchscreen and a touch display device including the same, the display panel being able to reduce differences in load between gate lines.

BRIEF DESCRIPTION OF THE SEVERAL VIEWS OF THE DRAWINGS

The above and other objects, features and advantages of the present disclosure will be more clearly understood from the following detailed description when taken in conjunction with the accompanying drawings, in which.

DETAILED DESCRIPTION

Figure 1:
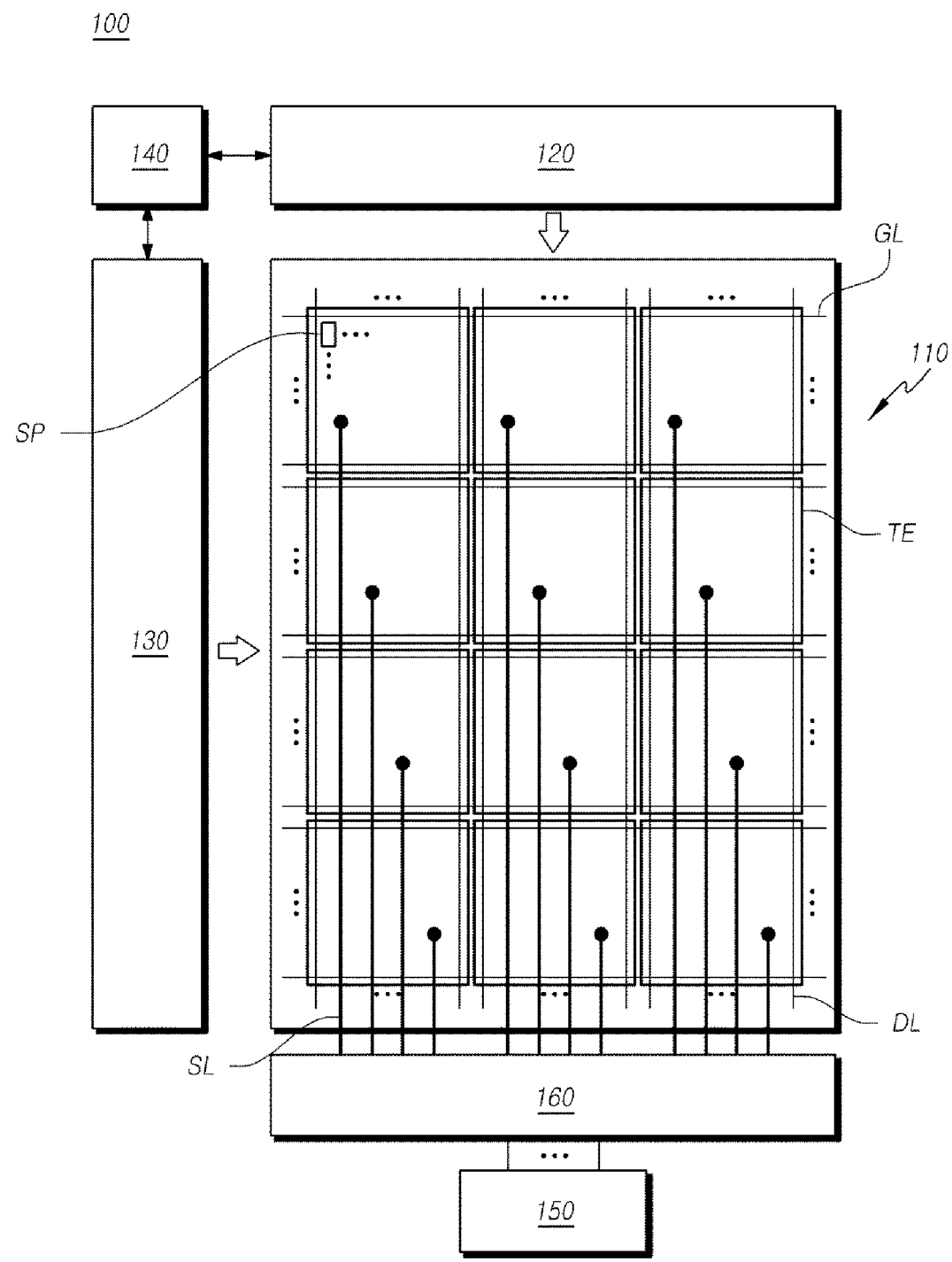
FIG. 1 is a configuration view schematically illustrating the system of a touch display device according to exemplary embodiments.

Hereinafter, reference will be made to embodiments of the present disclosure in detail, examples of which are illustrated in the accompanying drawings. Throughout this document, reference should be made to the drawings, in which the same reference numerals and signs will be used to designate the same or like components. In the following description of the present disclosure, detailed descriptions of known functions and components incorporated herein will be omitted in the case that the subject matter of the present disclosure may be rendered unclear thereby.

It will also be understood that, while terms such as "first," "second," "A," "B," "(a)," and "(b)" may be used herein to describe various elements, such terms are only used to distinguish one element from another element. The substance, sequence, order or number of these elements is not limited by these terms. It will be understood that when an element is referred to as being "connected to" or "coupled to" another element, not only can it be "directly connected or coupled to" the other element, but it can also be "indirectly connected or coupled to" the other element via an "intervening" element. In the same context, it will be understood that when an element is referred to as being formed "on" or "under" another element, not only can it be directly formed on or under another element, but it can also be indirectly formed on or under another element via an intervening element.

FIG. 1 is a configuration view schematically illustrating the system of a touch display device 100 according to exemplary embodiments.

Referring to FIG. 1, the touch display device 100 according to the present embodiments is a device able to provide an image display function and a touch sensing function.

The touch display device 100 according to the present embodiments may be a medium-sized or larger device, such as a TV or a monitor, or a mobile device, such as a smartphone or a tablet computer, having the function of sensing a touch input.

Referring to FIG. 1, the touch display device 100 according to the present embodiments includes a display panel 110, a data driver circuit 120, a gate driver circuit 130, and a controller 140 to provide a display function.

The display panel 110 has a plurality of data lines DL arranged in a first direction (e.g., in columns) and a plurality of gate lines GL arranged in a second direction (e.g., in rows).

The data driver circuit 120 drives the plurality of data lines DL.

The gate driver circuit 130 drives the plurality of gate lines GL.

The controller 140 controls the data driver circuit 120 and the gate driver circuit 130 by supplying a variety of control signals to the same.

The controller 140 starts scanning based on timing realized by each frame, converts image data input by an external source into a data signal format readable by the data driver circuit 120, outputs the converted image data, and at a suitable point in time, controls data processing in response to the scanning.

The controller 140 may be a timing controller used in display technology or may be a control device including the timing controller and configured to perform other control functions.

The data driver circuit 120 drives the plurality of data lines DL by supplying data voltages to the same. Hereinafter, the data driver circuit 120 may also be referred to as a "source driver circuit."

The gate driver circuit 130 sequentially drives the plurality of gate lines GL by sequentially supplying scanning signals to the same. Hereinafter, the gate driver circuit 130 may also be referred to as a "scanning driver circuit."

The gate driver circuit 130 sequentially supplies scanning signals, respectively having an on or off voltage, to the plurality of gate lines GL under the control of the controller 140.

When a specific gate line is opened by the gate driver circuit 130, the data driver circuit 120 converts image data received from the controller 14 into analog data voltages and supplies the analog data voltages to the plurality of data lines DL.

Although the data driver circuit 120 is illustrated in FIG. 1 as being positioned on one side of (e.g., above or below) the display panel 110, the data driver circuit 120 may be positioned on both sides of (e.g., both above and below) the display panel 110 depending on the driving system, the design of the panel, and so on.

Although the gate driver circuit 130 is illustrated in FIG. 1 as being positioned on one side (e.g., to the left or to the right) of the display panel 110, the gate driver circuit 130 may be positioned on both sides (e.g., both to the left and to the right) of the display panel 110.

The controller 140 receives a variety of timing signals, including a vertical synchronization signal Vsync, a horizontal synchronization signal Hsync, an input data enable (DE) signal, and a clock signal, as well as input image data, from an external source (e.g., an external host system).

The controller 140 not only outputs image data input from an external source by converting the image data into a data signal format readable by the data driver circuit 120, but also receives a variety of received timing signals, including a vertical synchronization signal Vsync, a horizontal synchronization signal Hsync, an input DE signal, and a clock signal, generates a variety of control signals, and outputs the variety of control signals to the data driver circuit 120 and the gate driver circuit 130 to control the data driver circuit 120 and the gate driver circuit 130.

For example, the controller 140 outputs a variety of gate control signals (GCSs), including a gate start pulse (GSP), a gate shift clock (GSC) signal, and a gate output enable (GOE) signal, to control the gate driver circuit 130.

Here, the GSP controls the operation start timing of one or more gate driver ICs (GDICs) of the gate driver circuit 130. The GSC signal is a clock signal commonly input to the GDICs to control the shift timing of scanning signals (gate pulses). The GOE signal designates the timing information of one or more GDICs.

In addition, the controller 140 outputs a variety of data control signals (DCSs), including a source start pulse (SSP), a source sampling clock (SSC) signal, and a source output enable (SOE) signal, to control the data driver circuit 120.

Here, the SSP controls the data sampling start timing of one or more SDICs of the data driver circuit 120. The SSC signal is a clock signal controlling the data sampling timing of each of the SDICs. The SOE signal controls the output timing of the data driver circuit 120.

The data driver circuit 120 may include one or more source driver ICs (SDICs) to drive the plurality of data lines.

Each of the SDICs may be connected to the bonding pads of the display panel 110 by tape automated bonding (TAB) or chip on glass (COG) bonding, may be directly disposed on the display panel 110, or in some cases, may be integrated with the display panel 110. In addition, each of the SDICs may be mounted on a film connected to the display panel 110 by a chip on film (COF) process.

Each of the SDICs may include a shift register, a latch circuit, a digital-to-analog converter (DAC), an output buffer, and so on.

The gate driver circuit 130 may include one or more gate driver integrated circuits (GDICs).

Each of the GDICs may be connected to the bonding pads of the display panel 110 by tape automated bonding (TAB) or chip on glass (COG) bonding, may be implemented as a gate in panel (GIP)-type IC directly disposed on the display panel 110, or in some cases, may be integrated with the display panel 110. In addition, each of the GDICs may be mounted on a film connected to the display panel 110 by a chip on film (COF) process.

Each of the GDICs may include a shift register, a level shifter, and so on.

The touch display device 100 according to the present embodiments may include at least one source printed circuit board (S-PCB) required for circuit connection to at least one SDIC and a control printed circuit board (C-PCB) on which control components and a variety electronic devices are mounted.

At least one SDIC may be mounted on the at least one S-PCB, or a film having at least one SDIC mounted thereon may be connected to the at least one S-PCB.

The controller 140, a power controller, and so on may be mounted on the C-PCB. The controller 140 controls the operations of the data driver circuit 120 and the gate driver circuit 130. In addition, the power controller supplies a variety of voltages or currents to the display panel 110, the data driver circuit 120, the gate driver circuit 130, and so on or controls a variety of voltages or currents to be supplied to the same.

The circuit of the at least one S-PCB may be connected to the circuit of the C-PCB via at least one connector, such as a flexible printed circuit (FPC), a flexible flat cable (FFC), or so on.

The at least one S-PCB and the C-PCB may be integrated as a single PCB.

The touch display device 100 according to the present embodiments may be one of various types of devices, such as a liquid crystal display (LCD) device, an organic light-emitting display device, and a plasma display panel (PDP).

Each of the subpixels disposed on the display panel 110 may include a circuit device, such as a transistor.

Referring to FIG. 1, the touch display device 100 according to the present embodiments includes a touch system providing a touch sensing function.

Referring to FIG. 1, the touch system includes a plurality of touch electrodes TE functioning as touch sensors, a touch circuit 150 sensing a touch by driving the plurality of touch electrodes TE, and so on. The touch circuit 150 may include several modules (e.g., a touch driver circuit and a touch sensing circuit), at least one of which may be included in each SDIC of the data driver circuit 120 or may form a separate IC together with the data driver circuit.

The touch circuit 150 can sequentially drive the plurality of touch electrodes TE by sequentially supplying a touch driving signal to the same.

Afterwards, the touch circuit 150 receives touch sensing signals from the touch electrodes to which the touch driving signal is applied.

The touch circuit 150 can determine a touch and touched coordinates based on the touch sensing signals received from the plurality of touch electrodes TE.

The touch driving signal may have the waveform of, for example, a pulse modulation signal having two or more voltage levels.

The touch sensing signals received from the plurality of touch electrodes TE may vary depending on whether or not the touch electrodes and the surroundings are touched by a pointer, such as a finger or a pen.

The touch circuit 150 may determine the touch and touched coordinates by obtaining changes in capacitance (or changes in voltages or changes in charge) in the touch electrodes TE based on the touch sensing signals.

Referring to FIG. 1, a signal line SL is connected to each of the plurality of touch electrodes TE such that a touch driving signal is supplied to each of the plurality of touch electrodes TE through the signal line SL.

The touch system further includes a switch circuit 160 to sequentially supply a touch driving signal to the plurality of touch electrodes TE. The switch circuit 160 sequentially connects signal lines SL, each of which is connected to the corresponding touch electrode of the plurality of touch electrodes TE, to the touch circuit 150.

The switch circuit 160 may be implemented as at least one multiplexer.

Referring to FIG. 1, the plurality of touch electrodes TE may be in the form of blocks.

In addition, the sizes of the touch electrodes TE may be equal or correspond to the areas of the single subpixels SP.

Alternatively, as illustrated in FIG. 1, the size of each of the subpixels TE may be greater than the area of each of the subpixels SP.

That is, each area size of the touch electrodes TE may correspond to the area size of two or more subpixels SP.

As described above, the size of each touch electrode TE is set to be greater than the area of each subpixel SP, the number of touch electrodes to be driven for touch sensing can be reduced. It is therefore possible to efficiently and rapidly perform touch driving and resultant touch sensing.

In addition, referring to FIG. 1, the plurality of touch electrodes TE may be disposed within the display panel 110.

In this circumstance, the display panel 110 may be referred to as having a touchscreen or a touchscreen panel disposed therein. That is, the display panel 110 may be an in-cell or on-cell display panel having a built-in touchscreen.

The touch display device 100 according to the present embodiments may operate in a display mode to provide a display function or in a touch mode to provide a touch sensing function.

In this regard, the plurality of touch electrodes TE may operate as touch sensors in touch mode periods but may be used as display mode electrodes in display mode periods.

For example, in display mode periods, the plurality of touch electrodes TE may operate as common voltage electrodes, an example of the display mode electrodes, to which a common voltage Vcom is applied.

The common voltage Vcom is a voltage corresponding to a pixel voltage applied to pixel electrodes.

As illustrated in FIG. 1, the plurality of touch electrodes TE disposed within the display panel 110 may be arranged in the form of a matrix consisting of N number of rows (N≥2) and M number of columns (M≥2).

Hereinafter, reference will be made to several embodiments of touch electrode structures, such as the shape and the arrangement of the touch electrodes TE.

Herein, a case in which twelve touch electrodes TE are arranged in four rows and three columns will be taken for the convenience of explanation. That is, the number N of the rows of the touch electrodes will be assumed to be 4, while the number M of the columns of the touch electrodes will be assumed to be 3.

The present embodiments disclose three types of touch electrode structures for efficient touch sensing.

First, a first-type touch electrode structure will be disclosed as a most simple, basic touch electrode structure.

The first-type touch electrode structure is a touch electrode structure in which a boundary area between two adjacent touch electrode rows is positioned in line.

Next, a second-type touch electrode structure able to improve the accuracy of touch sensing to be higher than the accuracy of touch sensing of the first-type touch electrode structure will be disclosed.

The second-type touch electrode structure is a touch electrode structure in which a boundary area between two adjacent touch electrodes TE in a first touch electrode column and a boundary area between two adjacent touch electrodes TE in a second touch electrode column adjacent to the first touch electrode column are not positioned in line.

Finally, a third-type touch electrode structure able to improve the accuracy of touch sensing to be higher than the accuracy of touch sensing of the first-type touch electrode structure will be disclosed.

The third-type touch electrode structure is a touch electrode structure, in which the edge portion of each touch electrode has the shape of a stair including two or more steps. Specifically, in a boundary between two adjacent touch electrodes TE in each touch electrode column, two or more steps of one edge portion of one touch electrode TE formed in the column direction oppose and are spaced apart from two or more steps of the edge portion of the other touch electrode TE formed in the column direction.

Hereinafter, the three types of touch electrode structures will be described in more detail.

The following description will be given of an exemplary case in which N is 4 and M is 3, i.e., a touchscreen panel (TSP) is disposed within a display panel 110 having twelve touch electrodes arranged in a matrix of four rows and three columns. Thus, the twelve touch electrodes are denoted in the form "TE (row number) (column number)." That is, the two touch electrodes are TE 11, TE 12, TE 13, TE 21, TE 22, TE 23, TE 31, TE 32, TE 33, TE 41, TE 42, and TE 43.

First, a description will be made of a first-type touch electrode structure with reference to FIGS. 2 to 5.

Figure 2:
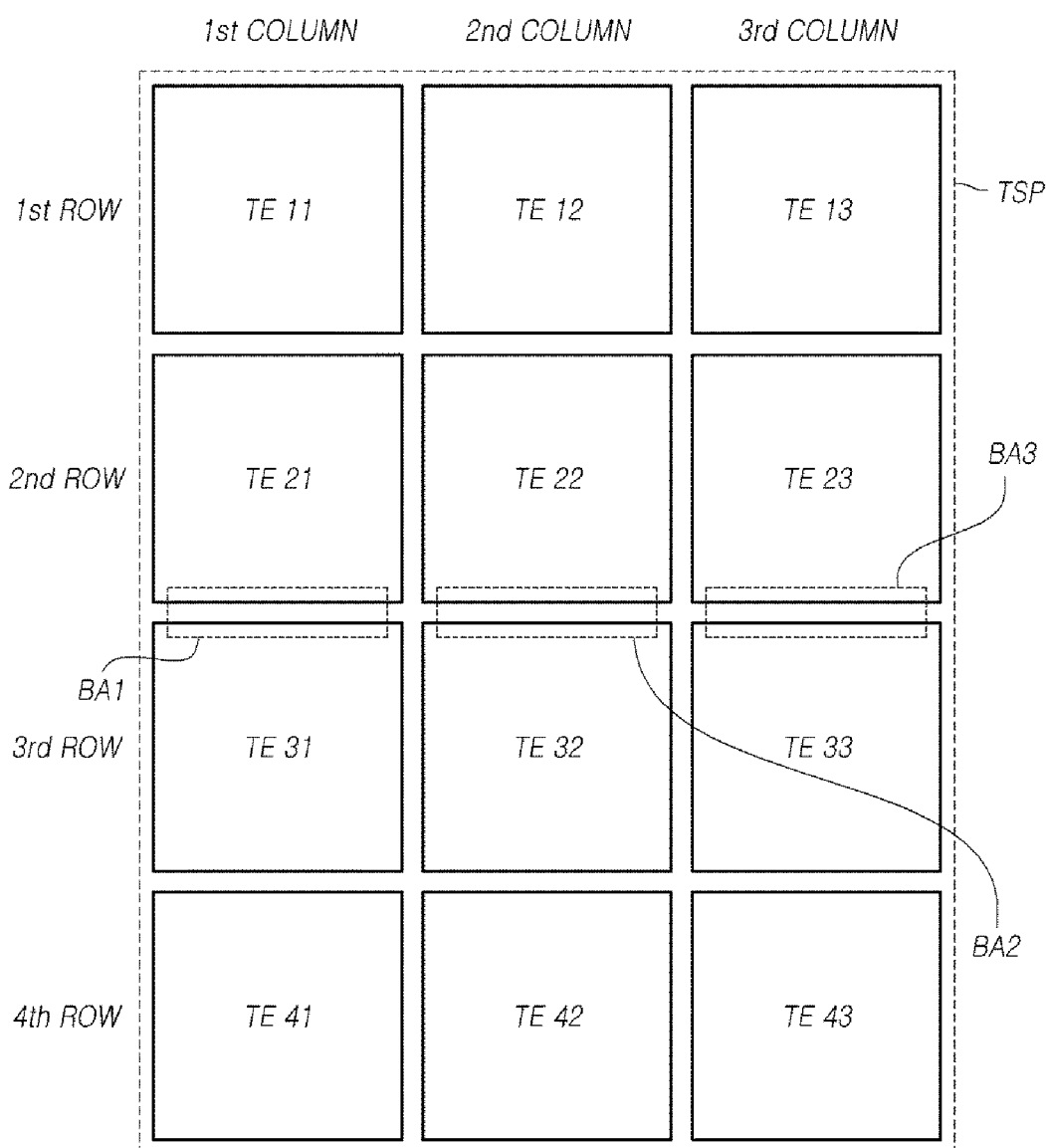
FIGS. 2 and 3 are views illustrating a first-type touch electrode structure of the touch display device according to the exemplary embodiments.
Figure 3:
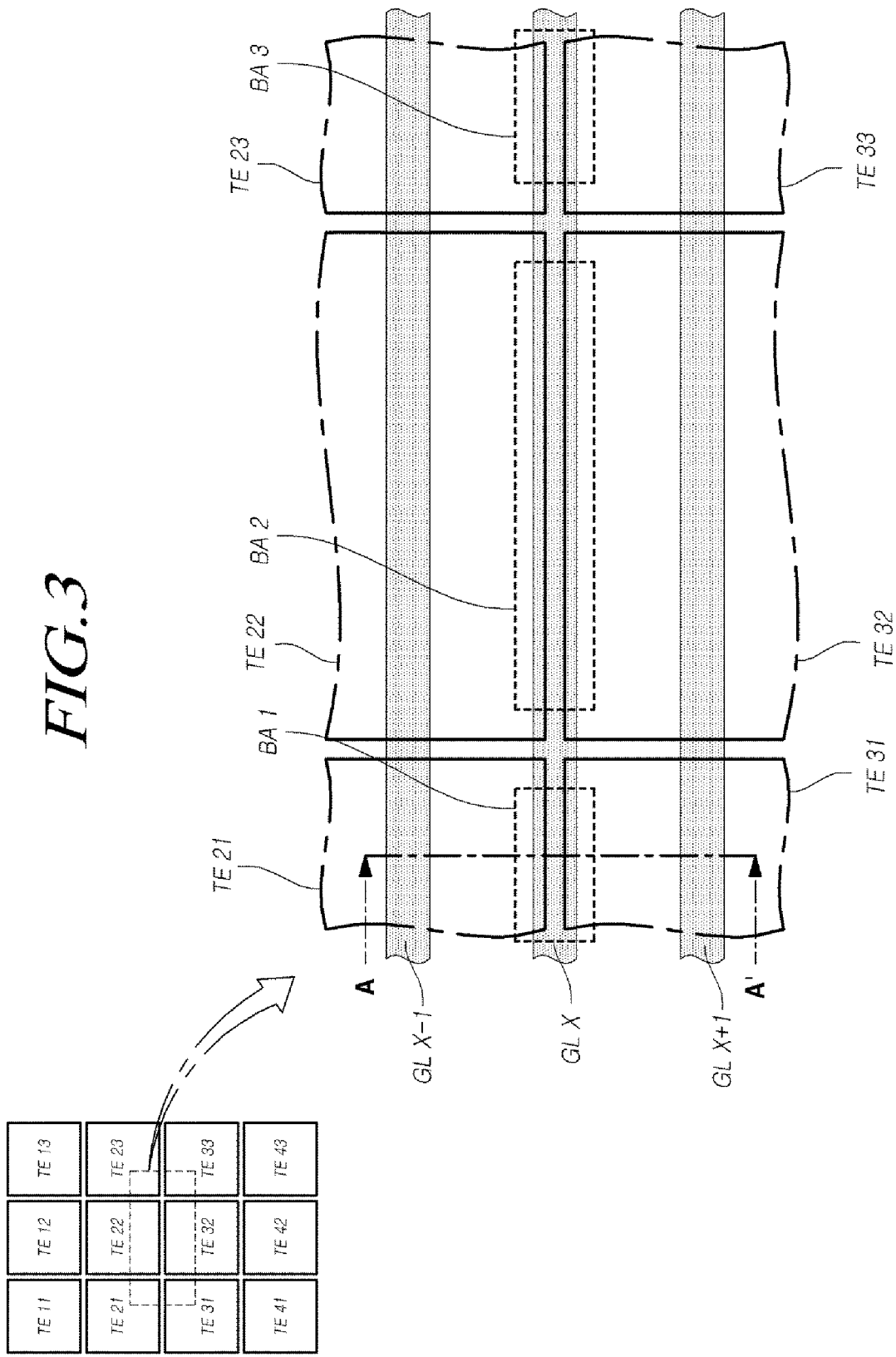

FIGS. 2 and 3 are views illustrating the first-type touch electrode structure of the touch display device 100 according to the present embodiments.

Referring to FIGS. 2 and 3, the first-type touch electrode structure is a touch electrode structure that has a most simple, basic touch electrode structure, as described above.

Referring to FIGS. 2 and 3, according to the first-type touch electrode structure, boundary areas (e.g., BA1, BA2, BA3) between two adjacent touch electrode rows are located in line with each other.

More specifically, according to the first-type touch electrode structure, a boundary area BA1 between two touch electrodes (e.g., TE 21, TE 31) adjacent to each other in a column direction of a first touch electrode column (a first column of touch electrodes), a boundary area BA2 between two touch electrodes (e.g., TE 22, TE 32) adjacent to each other in a column direction of a second touch electrode column (a second column of touch electrodes) adjacent to the first touch electrode column, and a boundary area BA3 between two touch electrodes (e.g., TE 23, TE 33) adjacent to each other in a column direction of a third touch electrode column (a third column of touch electrodes) adjacent to the second touch electrode column are located in line with each other.

Referring to FIG. 3, since a single touch electrode corresponds to two or more sub-pixels, at least one gate line (GL X−1, GL X+1) is not located on boundary areas (BA1, BA2, BA3) between two adjacent touch electrode rows, and a specific gate line (GL X) may be located on boundary areas between adjacent touch electrode rows.

Figure 4:
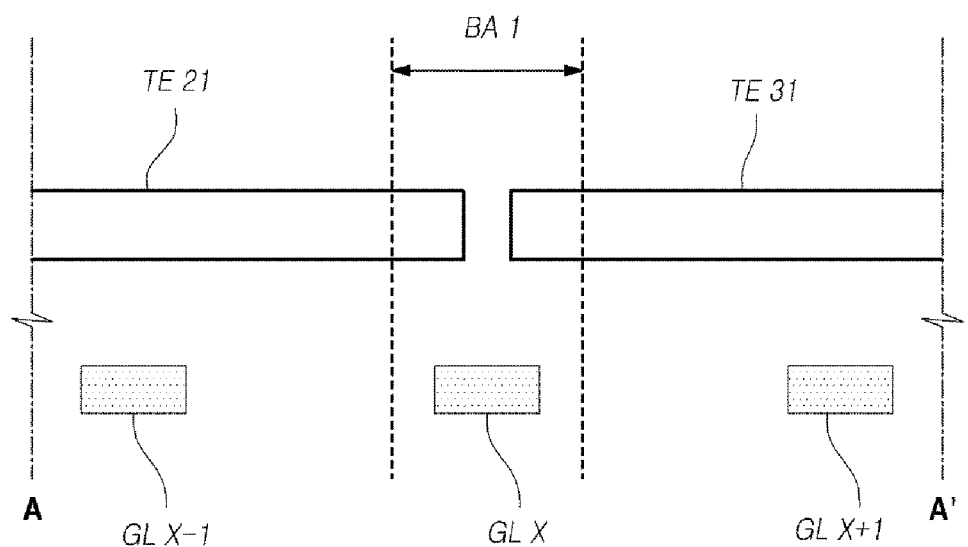
FIG. 4 is a cross-sectional view illustrating an area in which two touch electrodes are adjacent to each other in a column direction in the first-type touch electrode structure according to the exemplary embodiments.

FIG. 4 is a cross-sectional view (taken along line A-A' of FIG. 3) illustrating an area in which two touch electrodes TE 21 and TE31 are adjacent to each other in a column direction in the first-type touch electrode structure according to the present embodiments.

Referring to FIG. 4, in the area in which the two touch electrodes TE 21 and TE 31 are adjacent to each other in the column direction, gate lines GL X−1 and GL X+1 are not located on the boundary area BA1 between the two touch electrodes TE 21 and TE 31.

On the contrary, the gate line GL X is located on the boundary area BA1 between the two touch electrodes TE 21 and TE 31.

Figure 5:
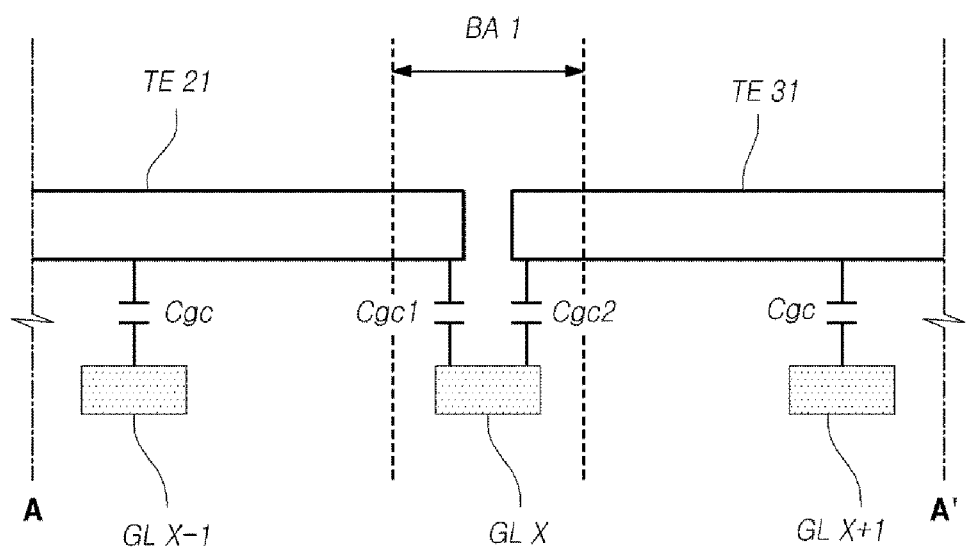
FIG. 5 is a cross-sectional view illustrating parasitic capacitance components formed by two adjacent touch electrodes in the column direction and surrounding gate lines in the first-type touch electrode structure according to the exemplary embodiments.

FIG. 5 is a cross-sectional view illustrating parasitic capacitance components Cgc, Cgc1, and Cgc2 formed by the two adjacent touch electrodes TE 21 and TE 31 in the column direction and surrounding gate lines GL X−1, GL X, and GL X+1, in the first-type touch electrode structure according to the present embodiments.

Referring to FIG. 5, since the boundary areas between two adjacent touch electrode rows are provided in line with each other in the first-type touch electrode structure, some gate lines GL X−1 and GL X+1 do not pass through the boundary area BA1, and only the gate line GL X passes through the boundary area BA1.

Referring to FIG. 5, since the gate line GL X disposed in the boundary area BA1 overlaps edge portions of the two touch electrodes TE 21 and TE 31, the gate line GL X forms parasitic capacitance components Cgc1 and Cgc2, together with the two touch electrodes TE21 and TE 31, respectively.

That is, the gate line GL X disposed in the boundary area BA1 forms parasitic capacitance components Cgc1 and Cgc2, together with the touch electrodes TE 21 and TE31, respectively.

On the contrary, since the gate line GL X−1 or GL X+1 that is not disposed in the boundary area BA1 that overlaps the edge portion of one touch electrode TE 21 or TE 31, only one parasitic capacitance Cgc is formed by the gate line GL X−1 or GL X+1 and the touch electrode TE 21 or TE 31.

Referring to FIG. 5, an area by which the gate line GL X disposed in the boundary area BA1 overlaps two touch electrodes TE 21 and TE 31 is smaller than an overlapping area between the gate line GL X−1 or GL X+1 that is not disposed in the boundary area BA1 and the touch electrode TE 21 or TE 31.

Considering that capacitance is proportional to the surface area of both positive and negative electrodes, a sum of parasitic capacitance components (Cgc1+Cgc2) formed by the gate line GL X disposed in the boundary area BA1 and two touch electrodes TE 21 and TE 31 is smaller than a sum of parasitic capacitance Cgc formed by the gate line GL X−1 or GL X+1, which is not located on the boundary area BA1, and one touch electrode TE 21 or TE 31.

Thus, the gate line GL X disposed in the boundary area BA1 has a smaller load compared to that of the gate lines GL X−1 and GL X+1 that are not located on the boundary area BA1.

The difference in load between the gate line GL X disposed in the boundary area BA1 and the gate lines GL X−1 and GL X+1 that are not disposed in the boundary area BA1, caused due to a difference in the parasitic capacitance components, causes gate signals to be different.

More specifically, a rising time and a falling time of a gate signal supplied via the gate line GL X disposed in the boundary area BA1 may differ from those of gate signals supplied via the gate line GL X−1 or GL X+1, which is not disposed in the boundary area BA1.

Thus, the gate line GL X disposed in the boundary area BA1 and the gate line GL X−1 or GL X+1, which is not disposed in the boundary area BA1, have different on-off timings, so a deviation of brightness may occur in a horizontal block form.

As set forth before, while it is easy to pattern a plurality of touch electrodes on a display panel 110 using the first-type touch electrode structure due to the simple configuration thereof, a problem exists in that a degradation in image quality may occur due to the difference in load between two-type gate lines (the gate line GL X disposed in the boundary area BA1; the gate line GL X−1 or GL X+1 that is not disposed in the boundary area BA1).

Therefore, embodiments of the present disclosure provide a touch electrode structure, including second-type and third-type touch electrode structures that can reduce the difference in load between gate lines by allowing parasitic capacitance formed by a set of a gate line and a touch electrode to have a similar value for each gate line.

Hereinafter, the second-type touch electrode structure and the third-type touch electrode structure will be described with reference to FIGS. 6 to 10 and FIGS. 11 to 13, respectively.

Figure 6:
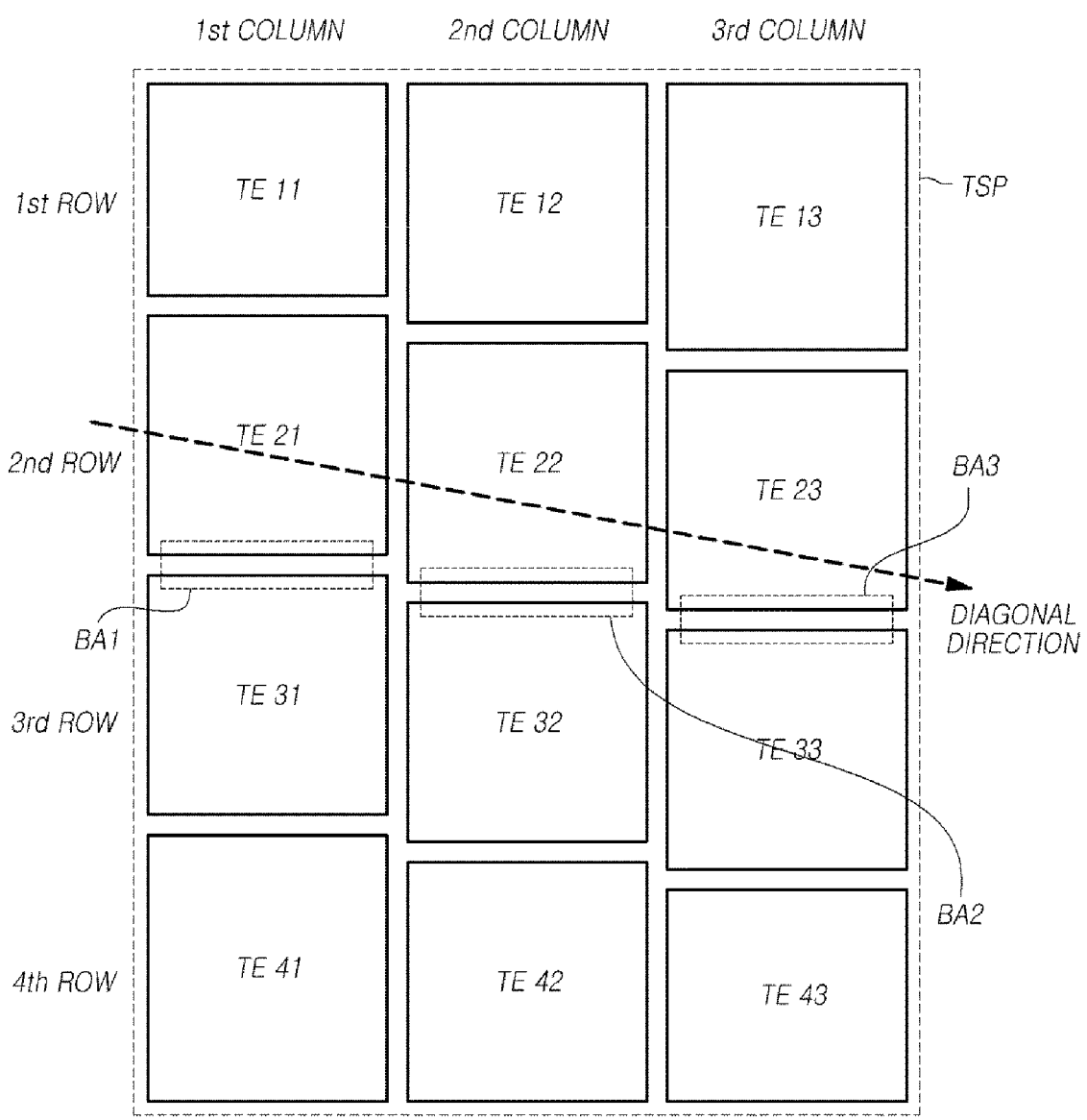
FIGS. 6 and 7 are views illustrating a second-type touch electrode structure of the touch display device according to the exemplary embodiments.
Figure 7:
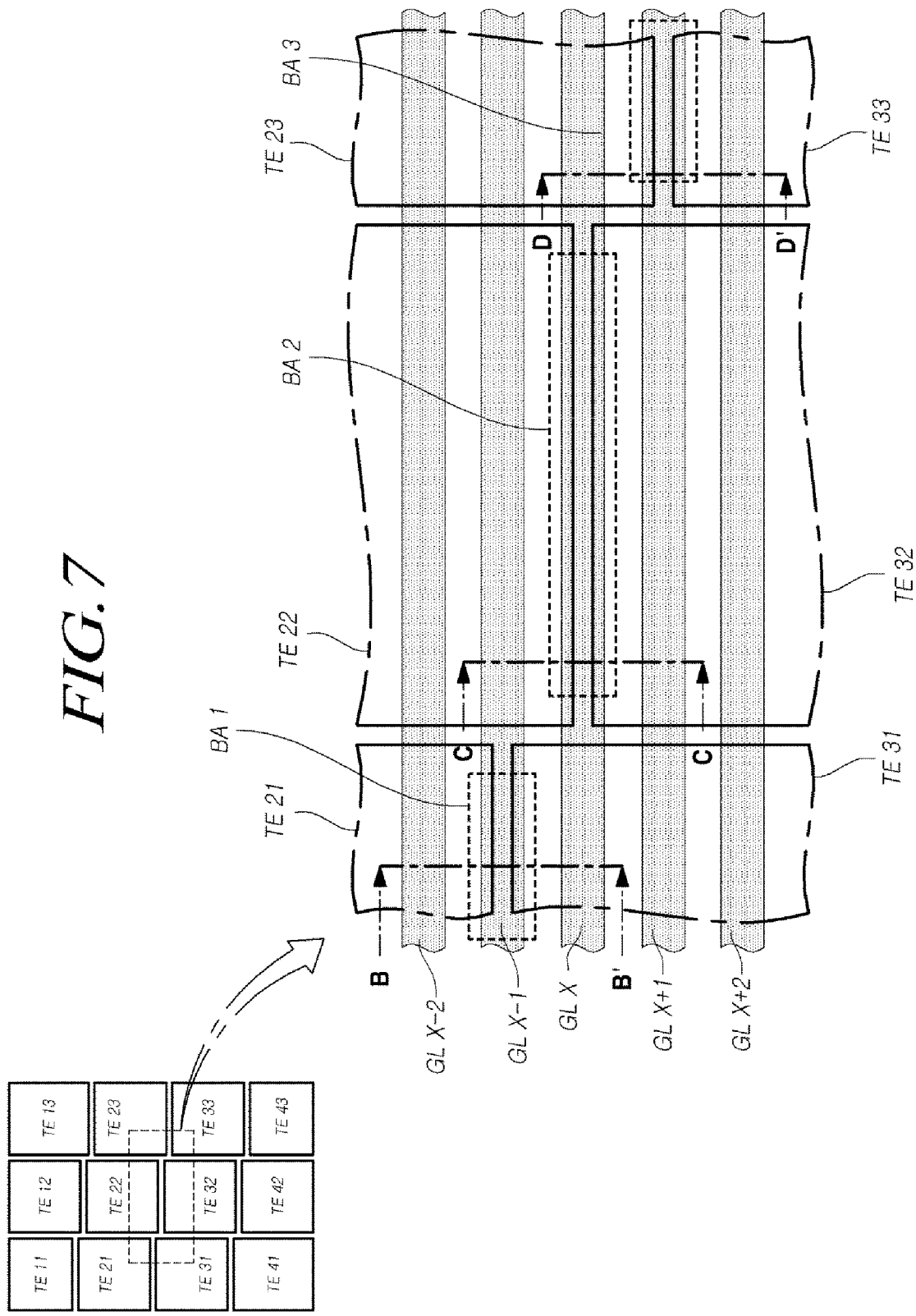

FIGS. 6 and 7 are views illustrating the second-type touch electrode structure of the touch display device 100 according to the present embodiments.

Referring to FIGS. 6 and 7, in a display panel 110 having a built-in touchscreen of the touch display device 100 according to the present embodiments, an nth touch electrode row (1≤n≤11) among 12 touch electrode rows includes a first touch electrode and a second touch electrode (in a case of n=2, TE 21 and TE 22) that are adjacent to each other in a row direction.

Further, in the touchscreen-equipped display panel 110, an (n+1)th touch electrode row (2≤n+1≤12) among 12 touch electrode rows includes a third touch electrode and a fourth touch electrode (in a case of n+1=3, TE 31 and TE 32) that are adjacent to each other in a row direction.

Referring to FIG. 6, for example, touch electrodes arranged in the same first touch electrode column, i.e., the first touch electrode TE 21 and the third touch electrode TE 31, are arranged adjacently to each other in a column direction.

Further, for example, touch electrodes arranged in the same second touch electrode column, i.e., the second touch electrode TE 22 and the fourth touch electrode TE 32, are arranged adjacently to each other in a column direction.

Referring to FIG. 6, a boundary area between two touch electrodes adjacent to each other in a column direction in respective touch electrode columns is not in line with a boundary area between two touch electrodes are adjacent to each other in a column direction in an adjacent touch electrode column.

For example, a boundary area BA1 between the first touch electrode TE 21 and the third touch electrode TE 31 and a boundary area BA2 between the second touch electrode TE 22 and the fourth touch electrode TE 32 are arranged in different lines.

That is, according to the second-type touch electrode structure, respective touch electrode rows may be arranged in a diagonal manner.

This configuration is different from that of the first-type touch electrode structure in which respective touch electrode rows are arranged in an aligned manner, rather than in a diagonal manner.

According to the aforementioned second-type touch electrode structure, with the configuration in which boundary areas BA1, BA2, and BA3 between two adjacent touch electrodes (TE 21 and TE 31; TE 22 and TE 32; TE 23 and TE 33) in a column direction in respective touch electrode columns on any two touch electrode rows (e.g., second and third rows) are not in line with each other, but are arranged in difference lines, compared to the first-type touch electrode structure, among the gate lines arranged in line with each other in a row direction, the number of gate lines that are arranged on the boundary areas BA1, BA2, and BA3 between two touch electrodes may increase. That is, two types of parasitic capacitance components Cgc1 and Cgc2 may be dispersed to a greater number of gate lines together with the touch electrodes, without concentrically relying on specific gate lines.

Referring to FIG. 6, among N touch electrode rows (in FIG. 6, N=4), a first touch electrode row and an Nth touch electrode row (the last touch electrode row) may be one or more touch electrodes having different sizes.

That is, referring to FIG. 6, TE 11, TE 12, and TE 13 of the first touch electrode row may have different sizes. In addition, TE 41, TE 42, and TE 43 of the Nth touch electrode row (the last touch electrode row) may have different sizes.

Further, referring to FIG. 6, the first touch electrode row and the Nth touch electrode row (the last touch electrode row) among the N touch electrode rows one or more touch electrodes having different sizes from those of touch electrodes included in the second to (N−1)th touch electrode rows.

Referring to FIG. 6, at least one electrode among touch electrodes TE 11, TE 12, and TE 13 in a first row and at least one electrode among touch electrodes TE 41, TE 42, and TE 43 in a fourth row may have larger or smaller sizes than touch electrodes in the second and third touch electrode rows.

This structural feature is obtained by the fact that, in spite of the display panel 110 being of a rectangle or square, respective touch electrode rows are arranged in a diagonal manner according to the second-type touch electrode structure.

FIG. 7 is an enlarged view illustrating a portion of a touchscreen panel (TSP) illustrated in FIG. 6, wherein a boundary area BA1 between a first touch electrode TE 21 and a third touch electrode TE 31, and a boundary area BA2 between a second touch electrode TE 22 and a fourth touch electrode TE 32 may be respectively provided with different gate lines.

That is, the boundary area BA1 between the first touch electrode TE 21 and the third touch electrode TE 31 in the first touch electrode column may be provided with a gate line GL X−1, whereas the boundary area BA2 between the second touch electrode TE 22 and the fourth touch electrode TE 32 in the second touch electrode column may be provided with a gate line GL X.

Likewise, a boundary area BA3 between two touch electrodes TE 23 and TE 33 in the third touch electrode column may be provided with a gate line GL X+1.

Hereinafter, a description will be made of relation between the second-type touch electrode structure and a gate line arrangement structure with reference to FIGS. 7 to 10.

Figure 8:
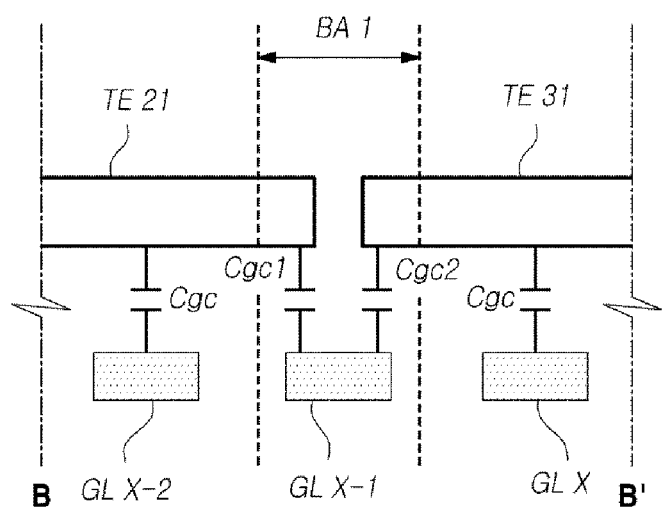
FIG. 8 is a cross-sectional view illustrating parasitic capacitance components formed by two adjacent touch electrodes in a first touch electrode column, together with surrounding gate lines, in the second-type touch electrode structure according to the exemplary embodiments.
Figure 9:
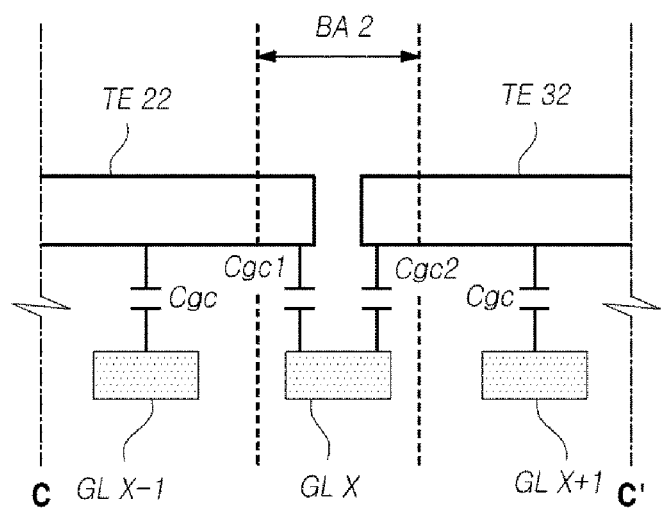
FIG. 9 is a cross-sectional view illustrating parasitic capacitance components formed by two adjacent touch electrodes in a second touch electrode column, together with surrounding gate lines, in the second-type touch electrode structure according to the exemplary embodiments.
Figure 10:
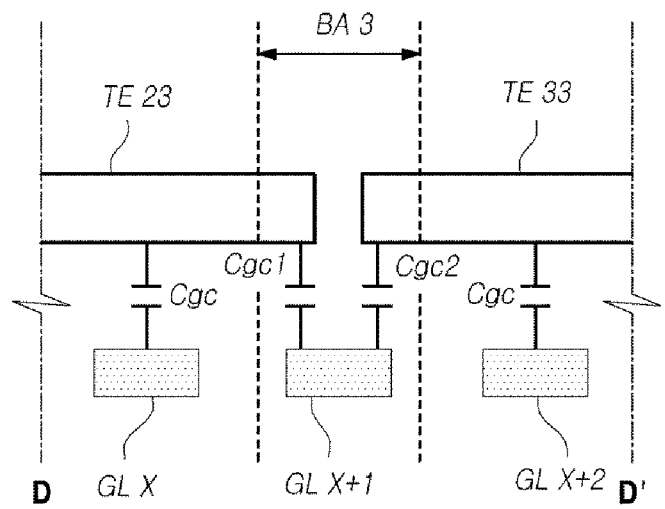
FIG. 10 is a cross-sectional view illustrating parasitic capacitance components formed by two adjacent touch electrodes in a third touch electrode column, together with surrounding gate lines, in the second-type touch electrode structure according to the exemplary embodiments.

FIG. 8 is a cross-sectional view (B-B') illustrating parasitic capacitance components formed by two adjacent touch electrodes TE 21 and TE 31 in a first touch electrode column, together with surrounding gate lines GL X−2, GL X−1, and GL X, in the second-type touch electrode structure according to the present embodiments. FIG. 9 is a cross-sectional view (C-C') illustrating parasitic capacitance components formed by two adjacent touch electrodes TE 22 and TE 32 in a second touch electrode column, together with surrounding gate lines GL X−1, GL X, and GL X+1, in the second-type touch electrode structure according to the present embodiments. FIG. 10 is a cross-sectional view (D-D') illustrating parasitic capacitance components formed by two adjacent touch electrodes TE 23 and TE 33 in a column direction in a third touch electrode column, together with surrounding gate lines GL X, GL X+1, and GL X+2, in the second-type touch electrode structure according to the present embodiments.

Referring to FIGS. 7 and 8, an (X−1)th gate line GL X−1 arranged on the boundary area BA1 between the first touch electrode TE 21 and the third touch electrode TE 31 may be arranged in an overlapping manner with edge portions of the first touch electrode TE 21 and the third touch electrode TE 31.

Thus, the (X−1)th gate line GL X−1 forms parasitic capacitance components Cgc1 and Cgc2 together with the edge portions of the first touch electrode TE 21 and the third touch electrode TE 31, respectively.

Referring to FIGS. 7 and 9, an Xth gate line GL X arranged on the boundary area BA2 between the second touch electrode TE 22 and the fourth touch electrode TE 32 may be arranged in an overlapping manner with edge portions of the second touch electrode TE 22 and the fourth touch electrode TE 32.

Thus, the Xth gate line GL X forms parasitic capacitance components Cgc1 and Cgc2 together with the edge portions of the second touch electrode TE 22 and the fourth touch electrode TE 32, respectively.

Referring to FIGS. 7 and 10, an (X+1)th gate line GL X+1 arranged on the boundary area BA3 between the touch electrodes TE 23 and TE 33 may be arranged in an overlapping manner with edge portions of the touch electrodes TE 23 and TE 33.

Thus, the (X+1)th gate line GL X+1 forms parasitic capacitance components Cgc1 and Cgc2 together with the edge portions of the touch electrodes TE 23 and TE 33, respectively.

When comparing the provision of parasitic capacitance components between the second-type touch electrode structure and the first-type touch electrode structure, in the case of the first-type touch electrode structure, a specific gate line (e.g., GL X) is only disposed in all of the boundary areas BA1, BA2, and BA3 between respective two touch electrodes as illustrated in FIG. 3. On the contrary, in the case of the second-type touch electrode structure, more gate lines (e.g., GL X−1, GL X, GL X+1) are dispersed and disposed in multiple boundary areas BA1, BA2, and BA3 as illustrated in FIG. 7.

Thus, in the case of the second-type touch electrode structure, parasitic capacitance components formed by the respective gate lines (e.g., GL X−1, GL X, GL X+1) together with corresponding touch electrodes have similar values for each gate line, which reduces a difference in load between gate lines, contributing to an improvement in image quality.

Hereinafter, a description will be made of the third-type touch electrode structure.

Figure 11:
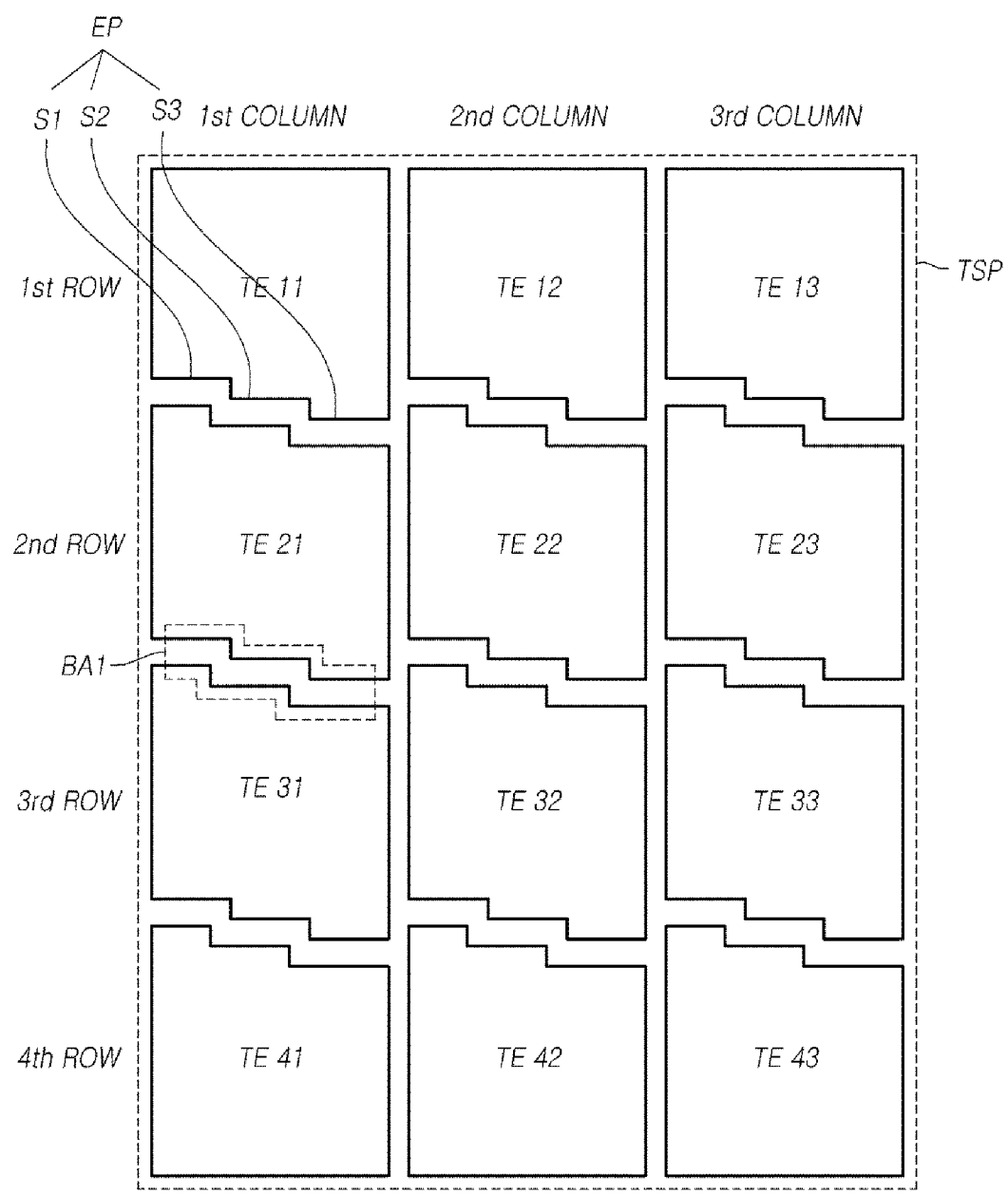
FIGS. 11 and 12 are views illustrating a third-type touch electrode structure of the touch display device according to the exemplary embodiments.
Figure 12:
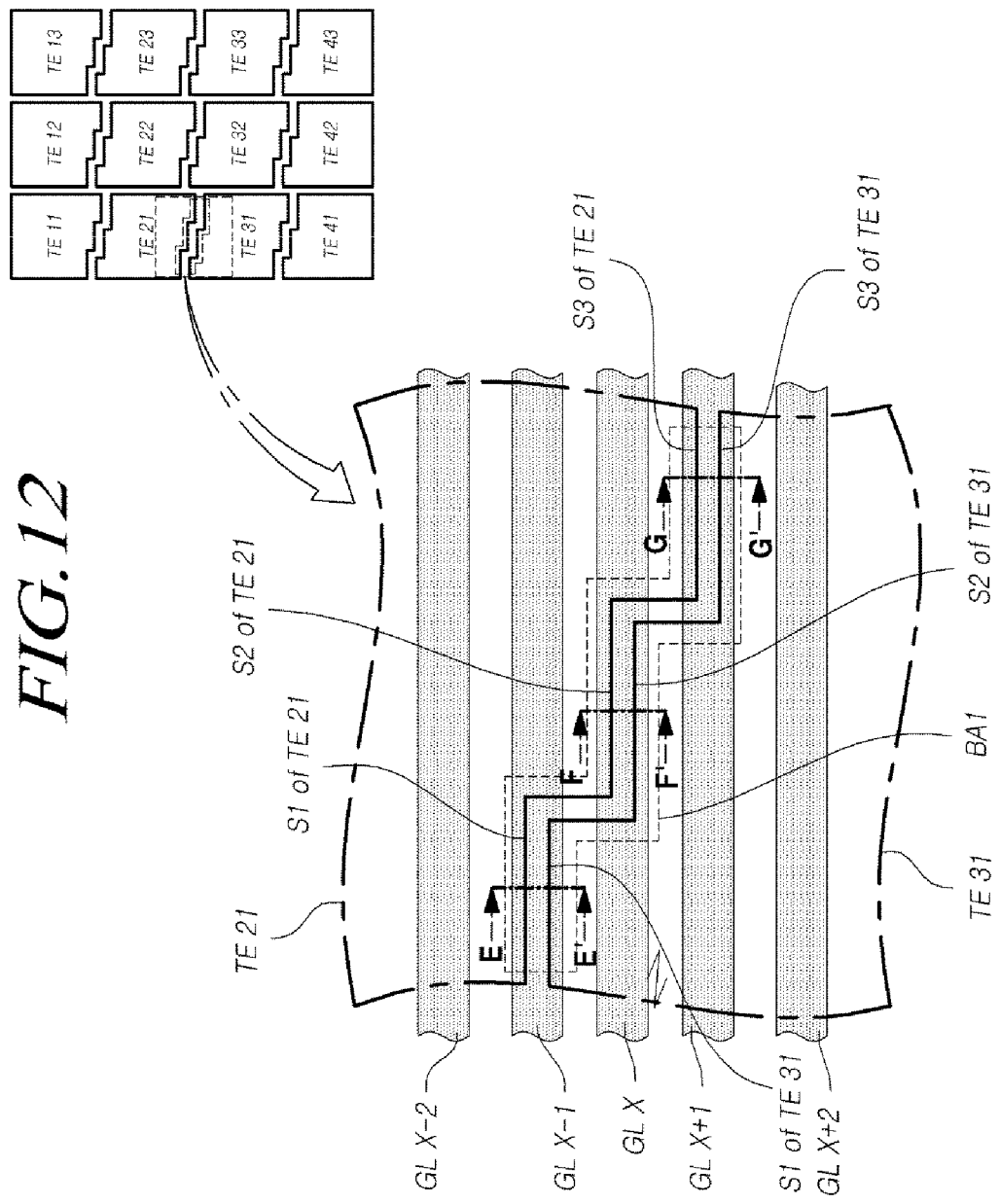
Figure 13:
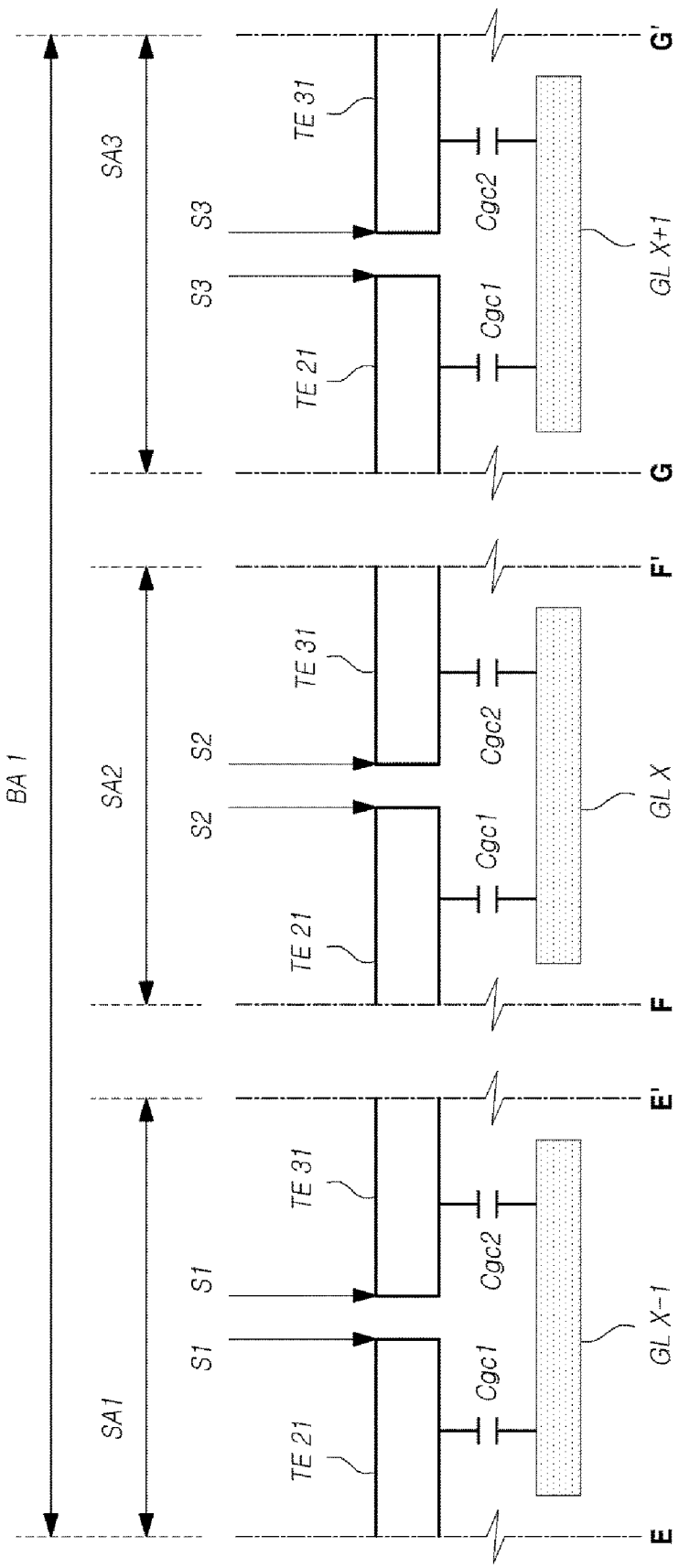
FIG. 13 is a cross-sectional view illustrating parasitic capacitance components formed by two adjacent touch electrodes in a column direction, together with surrounding gate lines in the third-type touch electrode structure according to the exemplary embodiments.

FIGS. 11 and 12 are views illustrating the third-type touch electrode structure of the touch display device 100 according to the present embodiments, and FIG. 13 is a cross-sectional view illustrating parasitic capacitance components formed by two adjacent touch electrodes in a column direction, together with surrounding gate lines in the third-type touch electrode structure according to the present embodiments.

Referring to FIG. 11, according to the third-type touch electrode structure, the display panel 110 having a built-in touchscreen is provided with a plurality of touch electrodes of N (N≥2) rows and M (M≥2) columns, wherein, in a case of N=4 and M=3, an nth touch electrode row (1≤n≤11) among 12 touch electrode rows includes a first touch electrode and a second touch electrode (in a case of n=2, TE 21 and TE 22) that are adjacent to each other in a row direction.

Further, in the display panel 110 having a built-in touchscreen, an (n+1)th touch electrode row (2≤n+1≤12) among 12 touch electrode rows includes a third touch electrode and a fourth touch electrode (in a case of n+1=3, TE 31 and TE 32) that are adjacent to each other in a row direction.

Referring to FIG. 11, for example, touch electrodes arranged in a first same touch electrode column, i.e., the first touch electrode TE 21 and the third touch electrode TE 31, are arranged adjacently to each other in a column direction.

Further, for example, touch electrodes arranged in the same second touch electrode column, i.e., the second touch electrode TE 22 and the fourth touch electrode TE 32, are arranged adjacently to each other in a column direction.

Referring to FIG. 11, a boundary area between two touch electrodes that are adjacent to each other in a column direction in a respective touch electrode column is not in line with a boundary area between two touch electrodes that are adjacent to each other in a column direction in an adjacent touch electrode column.

For example, a boundary area BA1 between the first touch electrode TE 21 and the third touch electrode TE 31 and a boundary area BA2 between the second touch electrode TE 22 and the fourth touch electrode TE 32 are arranged in different lines.

This is the same as in the second-type touch electrode structure.

However, in a case of the second-type touch electrode structure, respective touch electrode rows are arranged in a diagonal manner, whereas, in a case of the third-type touch electrode structure, respective touch electrode rows are not arranged in an aligned manner, rather than in a diagonal manner.

To obtain the same effect (a reduction in the difference of gate loads through distribution of parasitic capacitance) of the second-type touch electrode structure in spite of having a different configuration from the second-type touch electrode structure, according to the third-type touch electrode structure, edge portions EP of respective touch electrodes in a column direction have the shape of a stair having two or more steps.

For example, in a case of the touch electrode TE 21, the edge portion EP of the touch electrode TE 21 in a column direction has the shape of a stair having three steps S1, S2, and S3.

Here, the greater the number of the steps of the edge portions EP provided in respective touch electrodes is, the greater the dispersion of parasitic capacitance components is, thereby reducing the difference of gate loads more significantly.

According to the aforementioned third-type touch electrode structure, with the configuration in which the shapes of the edge portions EP of respective touch electrodes are designed to have a stair, compared to the first-type touch electrode structure, among the gate lines arranged in line with each other in a row direction, the number of gate lines that are arranged on the boundary areas BA1, BA2, and BA3 between two touch electrodes may increase. This feature is similar to that of the second-type touch electrode structure.

Two or more steps of the edge portion EP of respective touch electrode may correspond to two or more gate lines.

Referring to FIG. 12, in a case of a boundary area BA1 between touch electrodes TE 21 and TE 31, for example, the edge portion EP of the touch electrode TE 21 has three steps S1, S2, and S3, and the edge portion EP of the touch electrode TE 31 forming the boundary area BA1 with the edge portion EP of the touch electrode TE 21 also has three steps S1, S2, and S3.

Referring to FIG. 12, the three steps S1, S2, and S3 of the edge portion EP of the touch electrode TE 21 are positioned to correspond to the three steps S1, S2, and S3 of the edge portion EP of the touch electrode TE 31.

Referring to FIGS. 12 and 13, the boundary area BA1 between the touch electrodes TE 21 and TE 31 includes an area SA1 in which the steps S1 of the edge portions EP of the touch electrodes TE 21 and TE 31 are positioned to correspond to each other, an area SA2 in which the steps S2 of the edge portions EP of the touch electrodes TE 21 and TE 31 are positioned to correspond to each other, and an area SA3 in which the steps S3 of the edge portions EP of the touch electrodes TE 21 and TE 31 are positioned to correspond to each other.

Referring to FIG. 12 and a sectional view taken along E-E' of FIG. 13, a gate line GL X−1 is arranged on the area SA1 in which the steps S1 of the edge portions EP of the touch electrodes TE 21 and TE 31 are positioned to correspond to each other.

The gate line GL X−1 forms parasitic capacitance components Cgc1 and Cgc2 together with the edge portions EP of the touch electrodes TE 21 and TE 31, respectively.

Referring to FIG. 12 and a sectional view taken along F-F' of FIG. 13, a gate line GL X is arranged on the area SA2 in which the steps S2 of the edge portions EP of the touch electrodes TE 21 and TE 31 are positioned to correspond to each other.

The gate line GL X forms parasitic capacitance components Cgc1 and Cgc2 together with the edge portions EP of the touch electrodes TE 21 and TE 31, respectively.

Referring to FIG. 12 and a sectional view taken along G-G' in FIG. 13, a gate line GL X+1 is arranged on the area SA3 in which the steps S3 of the edge portions EP of the touch electrodes TE 21 and TE 31 are positioned to correspond to each other.

The gate line GL X+1 forms parasitic capacitance components Cgc1 and Cgc2 together with the edge portions EP of the touch electrodes TE 21 and TE 31, respectively.

When comparing the generation of parasitic capacitance components between the third-type touch electrode structure and the first-type touch electrode structure, in the case of the first-type touch electrode structure, only a specific gate line (e.g., GL X) is disposed in all of the boundary areas BA1, BA2, and BA3 between respective two touch electrodes as illustrated in FIG. 3. On the contrary, in the case of the third-type touch electrode structure, a greater number of gate lines (e.g., GL X−1, GL X, GL X+1) are dispersed and disposed in multiple areas SA1, SA2, and SA3 in a single boundary areas BA as illustrated in FIGS. 11 to 13.

Thus, in the case of the third-type touch electrode structure, parasitic capacitance components formed by the respective gate lines (e.g., GL X−1, GL X, GL X+1) together with corresponding touch electrodes have similar values for each gate line, which reduces a difference in load between gate lines, contributing to an improvement in image quality.

Referring to FIG. 11, according to the third-type touch electrode structure, in a case of respective touch electrodes included in the second and (N−1)th touch electrodes rows among N touch electrode rows, both edge portions EP in a column direction have the shape of a stair, whereas, in a case of respective touch electrodes included in the first touch electrode row and the Nth touch electrode row (the last touch electrode row, e.g., the fourth touch electrode row of FIG. 11) among N touch electrode rows, only one of edge portions EP in a column direction has the shape of a stair.

This structural feature is obtained by the fact that the display panel 110 has the shape of a rectangle or a square.

According to the aforementioned exemplary embodiments, it is possible to provide the display panel 110 having a built-in touchscreen and the touch display device 100 including the same, the touch electrode structure of the display panel 110 allowing parasitic capacitance to be dispersed to a greater number of gate lines, which form parasitic capacitance together with touch electrodes, without concentrically relying on specific gate lines.

Further, according to the exemplary embodiments, it is possible to provide the display panel 110 having a built-in touchscreen able to reduce differences in load between gate lines and the touch display device 100 including the same.

The foregoing descriptions and the accompanying drawings have been presented in order to explain the certain principles of the present disclosure. A person skilled in the art to which the disclosure relates can make many modifications and variations by combining, dividing, substituting for, or changing the elements without departing from the principle of the disclosure. The foregoing embodiments disclosed herein shall be interpreted as illustrative only but not as limitative of the principle and scope of the disclosure. It should be understood that the scope of the disclosure shall be defined by the appended Claims and all of their equivalents fall within the scope of the disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A touch-screen panel, comprising:
  a plurality of gate lines arranged in a first direction; and
  a plurality of touch electrodes arranged in N number of rows of the first direction, where N>2, and M number of columns of a second direction, where M>2,
  wherein a first touch electrode, a second touch electrode adjacent to the first touch electrode, and a third touch electrode adjacent to the second touch electrode are arranged in a first touch electrode row of the N number of rows and arranged in a gate line direction in which the plurality of gate lines is arranged,
  wherein an edge portion of the first touch electrode is spaced apart from a fourth touch electrode arranged in an identical column to the first touch electrode by a first gap which extends in the gate line direction,
  wherein an edge portion of the second touch electrode is spaced apart from a fifth touch electrode arranged in an identical column to the second touch electrode by a second gap which extends in the gate line direction,
  wherein an edge portion of the third touch electrode is spaced apart from a sixth touch electrode arranged in an identical column to the third touch electrode by a third gap which extends in the gate line direction,
  wherein the first gap, the second gap and the third gap are not aligned with one another in the gate line direction,
  wherein the first touch electrode, the second touch electrode, and the third touch electrode have different sizes, and wherein the fourth touch electrode, the fifth touch electrode, and the sixth touch electrode have a substantially same size.

2. The touch-screen panel according to claim 1 wherein an edge portion of each of the touch electrodes formed in the second direction has a stepped shape including at least two steps.

3. The touch-screen panel according to claim 2 wherein the at least two steps of the edge portion of each of the touch electrodes formed in the column direction correspond to two or more gate lines among the plurality of gate lines.

4. The touch-screen panel according to claim 2 wherein each of the at least two steps corresponds to at least one of the plurality of gate lines.

5. The touch-screen panel according to claim 2 wherein a boundary area between the first touch electrode and the fourth touch electrode, that is adjacent to the first touch electrode in a column direction, includes at least two boundary sub-areas, and wherein a first boundary sub-area of the at least two boundary sub-areas and a second boundary sub-area of the at least two boundary sub-areas are disposed on different gate lines of the plurality of gate lines.

6. The touch-screen panel according to claim 1 wherein an Nth touch electrode row in the N number of touch electrode rows includes at least one touch electrode having a different size from the other touch electrodes of the Nth touch electrode row.

7. The touch-screen panel according to claim 1 wherein each of the first touch electrode row and an Nth touch electrode row in the N number of touch electrode rows includes at least one touch electrode having a different size from respective touch electrodes of a second touch electrode row to a (N−1)th touch electrode row in the N number of touch electrode rows.

8. The touch-screen panel according to claim 1 wherein an area of each of the plurality of touch electrodes corresponds to an area of two or more subpixels.

9. The touch-screen panel according to claim 1, wherein gate lines arranged in a boundary area between the first touch electrode and the fourth touch electrode differ from gate lines arranged in a boundary area between the second touch electrode and the fifth touch electrode.

10. The touch-screen panel according to claim 9 wherein an (X−1)th gate line disposed in the boundary area between the first touch electrode and the fourth touch electrode overlaps the edge portion of the first touch electrode and an edge portion of the fourth touch electrode, and an Xth gate line disposed in the boundary area between the second touch electrode and the fifth touch electrode overlaps the edge portion of the second touch electrode and an edge portion of the fifth touch electrode.

11. A touch display device, comprising:
- a display panel including a plurality of data lines and a plurality of gate lines arranged thereon and a plurality of touch electrodes arranged in N number of rows of a first direction, where N>2, and M number of columns of a second direction, where M>2; and
- a touch circuit configured to sense a touch by driving the plurality of touch electrodes,
- wherein a first touch electrode, a second touch electrode adjacent to the first touch electrode, and a third touch electrode adjacent to the second touch electrode are arranged in a first touch electrode row of the N number of rows and arranged in a gate line direction in which the plurality of gate lines is arranged,
- wherein an edge portion of the first touch electrode is spaced apart from a fourth touch electrode arranged in an identical column to the first touch electrode by a first gap which extends in the gate line direction,
- wherein an edge portion of the second touch electrode is spaced apart from a fifth touch electrode arranged in an identical column to the second touch electrode by a second gap which extends in the gate line direction,
- wherein an edge portion of the third touch electrode is spaced apart from a sixth touch electrode arranged in an identical column to the third touch electrode by a third gap which extends in the gate line direction,
- wherein the first gap, the second gap and the third gap are not aligned with one another in the gate line direction,
- wherein the first touch electrode, the second touch electrode, and the third touch electrode have different sizes, and wherein the fourth touch electrode, the fifth touch electrode, and the sixth touch electrode have a substantially same size.

12. The touch display device according to claim 11 wherein an edge portion of each of the touch electrodes formed in the second direction has a stepped shape including at least two steps.

13. The touch display device according to claim 12 wherein the at least two steps of the edge portion of each of the touch electrodes formed in the column direction correspond to two or more gate lines among the plurality of gate lines.

14. The touch display device according to claim 12 wherein each of the at least two steps corresponds to at least one of the plurality of gate lines.

15. The touch display device according to claim 12 wherein a boundary area between the first touch electrode and the fourth touch electrode, that is adjacent to the first touch electrode in a column direction, includes at least two boundary sub-areas, and wherein a first boundary sub-area of the at least two boundary sub-areas and a second boundary sub-area of the at least two boundary sub-areas are disposed on different gate lines of the plurality of gate lines.

16. The touch display device according to claim 11 wherein an Nth touch electrode row in the N number of touch electrode rows includes at least one touch electrode having a different size from the other touch electrodes of the Nth touch electrode row.

17. The touch display device according to claim 11 wherein each of the first touch electrode row and an Nth touch electrode row in the N number of touch electrode rows includes at least one touch electrode having a different size from respective touch electrodes of a second touch electrode row to a (N−1)th touch electrode row in the N number of touch electrode rows.

18. The touch display device according to claim 11 wherein an area of each of the plurality of touch electrodes corresponds to an area of two or more subpixels.

19. The touch display device according to claim 11, wherein gate lines arranged in a boundary area between the first touch electrode and the fourth touch electrode differ from gate lines arranged in a boundary area between the second touch electrode and the fifth touch electrode.

20. The touch display device according to claim 19 wherein an (X−1)th gate line disposed in the boundary area between the first touch electrode and the fourth touch electrode overlaps the edge portion of the first touch electrode and an edge portion of the fourth touch electrode, and an Xth gate line disposed in the boundary area between the second touch electrode and the fifth touch electrode overlaps an edge portion of the second touch electrode and an edge portion of the fifth touch electrode.

\* \* \* \* \*